US008333036B2

(12) United States Patent
Helms et al.

(10) Patent No.: US 8,333,036 B2
(45) Date of Patent: Dec. 18, 2012

(54) EMERGENCY EGRESS ASSEMBLY EMBEDDED IN A VEHICLE DOOR (75) Inventors: James M. Helms, Fort Myers, FL (US); Thomas G. Buckner, Gibsonia, PA (US); Michael L. Hafften, Loretto, MN (US)

(73) Assignee: Ibis Tek, LLC, Butler, PA (US)

( * ) Notice: Subject to any disclaimer, the term of this patent is extended or adjusted under 35 U.S.C. 154(b) by 239 days.

(21) Appl. No.: 12/802,141

(22) Filed: May 28, 2010

(65) Prior Publication Data

US 2011/0289850 A1 Dec. 1, 2011

(51) Int. Cl.
E05B 65/10 (2006.01)

(52) U.S. Cl. .......................................................... 49/141

(58) Field of Classification Search ............... 49/141, 49/502, 348, 349
See application file for complete search history.

(56) References Cited

U.S. PATENT DOCUMENTS

| | | | | |
|---|---|---|---|---|
| 2,830,843 | A * | 4/1958 | Seaburg et al. ................ | 49/449 |
| 4,443,035 | A * | 4/1984 | Saemann .................... | 296/190.1 |
| 4,986,593 | A * | 1/1991 | Lohmann .................... | 296/190.1 |
| 5,504,974 | A * | 4/1996 | Graber ........................... | 16/438 |
| 5,787,643 | A * | 8/1998 | Schmuck ....................... | 49/141 |
| 5,791,727 | A * | 8/1998 | Doescher et al. ........... | 296/190.1 |
| 5,826,824 | A * | 10/1998 | Martin et al. ............... | 244/129.3 |
| 6,027,073 | A * | 2/2000 | Gratien Ferrier ........... | 244/129.3 |
| 6,308,918 | B1 * | 10/2001 | Ferrier ......................... | 244/129.3 |
| 6,412,584 | B1 * | 7/2002 | Faigle et al. .................... | 180/282 |
| 6,427,383 | B1 * | 8/2002 | Brooks et al. .................. | 49/141 |
| 6,474,705 | B1 * | 11/2002 | Mori et al. .................... | 292/216 |
| 6,688,658 | B2 * | 2/2004 | Mori et al. ....................... | 292/56 |
| 6,726,271 | B2 * | 4/2004 | Stanton et al. ............ | 296/146.15 |
| 6,823,632 | B2 * | 11/2004 | Yun ................................. | 52/202 |
| 7,730,668 | B2 * | 6/2010 | Dankert et al. .................. | 49/141 |
| 2005/0115151 | A1 * | 6/2005 | Gevay ............................. | 49/141 |
| 2006/0130403 | A1 * | 6/2006 | Krehbiel et al. ................ | 49/141 |
| 2010/0259067 | A1 * | 10/2010 | Bell et al. ................. | 296/146.11 |
| 2011/0084521 | A1 | 4/2011 | Shellenberger et al. | |

* cited by examiner

Primary Examiner — Jerry Redman
(74) Attorney, Agent, or Firm — Karen Tang-Wai Sutton (57) ABSTRACT A vehicle emergency egress assembly, including a vehicle door with an opening cut out or otherwise provided, to serve as an egress portal in case of emergency when the vehicle door is difficult to open using the ordinary latching and unlatching mechanism provided for routine entrance and exit from the vehicle. The opening is cut (or otherwise provided) where a transparent armor window would ordinarily be provided, but additional portions of the door are cut out as needed to allow for egress through the opening by a vehicle occupant. A windowed plug is then provided, for releasably plugging the opening. Finally, an interiorly accessible release mechanism is provided, including one or more handles for releasing the plug from the opening. The plug includes a body portion in addition to a window portion. The body portion has a stepped periphery that is held against a stepped periphery of the opening by latches coupled to the one or more handles and extending across the perimeter of the body portion of the plug onto corresponding latch receivers disposed around the opening on the inside surface of the vehicle door.

16 Claims, 8 Drawing Sheets

EMERGENCY EGRESS ASSEMBLY EMBEDDED IN A VEHICLE DOOR

FIELD OF THE INVENTION

The present invention relates to emergency egress from an armored vehicle, and more particularly to an emergency egress assembly embedded in and encompassing a vehicle door having a window, enabling occupants to rapidly exit the vehicle by removing the window and a portion of the door.

BACKGROUND OF THE INVENTION

Insurgent attacks on US troops supporting ongoing operations for the Global War On Terrorism (GWOT) in Iraq and Afghanistan have exposed vulnerabilities of the ground vehicles used by our troops. Consequently, the HMMWV (commonly known as a HumVee) and other light tactical military vehicles are now at least sometimes (in at least some configurations) armored, to counter the insurgent threats and provide an increased level of soldier protection.

A new issue results in that the additional weight of the armor and associated upward shift in center of gravity of the vehicle have caused these vehicles to become increasingly unstable and difficult for the troops to control. Numerous rollover accidents have and continue to occur, given the tendency of these vehicles to go out of control and tip during evasive maneuvering, off-road travel and IED/RPG (improvised explosive device/rocket propelled grenade). When such an armored vehicle rolls over, the crew sometimes cannot egress via the doors due to the weight of the armor on the doors, or due to jamming of doors from the vehicle frame twisting. The gunner's station is not an option for exit either if the vehicle is upside-down. The result is that the crew is often killed due to vehicle fires, follow-up insurgent attacks, trauma injuries and drowning.

One thing that could help for armored vehicles is a simple-to-operate and cost-effective emergency egress assembly embedded in a door of such a vehicle, an emergency egress assembly that does not compromise the required levels of protection from small arms fire and blast or other explosive effects.

SUMMARY OF THE INVENTION

Accordingly, the present invention provides a vehicle emergency egress assembly, comprising: a vehicle door of one or more layers of opaque armor and having an opening therethrough in an interior portion, the opening for serving as an egress portal, and having a door-born portion of a latching and unlatching mechanism for routine opening and closing of the vehicle door when the vehicle door is mounted on a vehicle; a plug, releasably disposable in the opening via a mating of a stepped periphery of the opening in the door and a corresponding stepped periphery of the plug, wherein the plug fills the opening when the plug is disposed in the opening, and wherein the plug includes a plug body comprising one or more layers of opaque material, a window pane of one or more layers of transparent material, and a window frame attached to the plug body and holding the window pane; and interiorly accessible release means selectively operable by a vehicle occupant for effecting release of the plug, such release permitting shifting the plug from the vehicle door, to allow emergency egress by the vehicle occupant.

In some embodiments, the release means includes a plurality of latch receivers provided as tapered blocks and disposed on the inside surface of the door in spaced apart relation around the opening, and also includes a corresponding plurality of respective latches pivotably attached to the plug and disposed so that in pivoting to a closed position to secure the plug in the opening each latch moves from a thin section of the corresponding latch receiver to a thicker section, thereby drawing the plug into the opening, with the stepped periphery of the plug mated with the stepped periphery of the opening.

In some such latch embodiments each latch is rigidly attached to a pivotable handle, and in other embodiments, one pivotable lever handle is provided with cabling connecting all the different latches, thereby making possible operating the release mechanism using the (single) lever handle.

A vehicle emergency egress assembly provided by the invention serves an altogether different purpose than a kick-out window, such as disclosed in U.S. Pat. No. 8,066,319 filed on Nov. 14, 2007 (and a corresponding PCT application published 2 Oct. 2008, having publication number WO 2008/118151). Whereas the latter provides another possible egress portal, the present invention is of use in case of a door being jammed or, because of the vehicle orientation and the weight of the door, being too heavy to open. The plug provided by the invention is typically about one half the weight of the entire door, and so by freeing the plug from the door using the release mechanism, a vehicle occupant can get out of the vehicle without having to maneuver the entire door.

BRIEF DESCRIPTION OF THE DRAWINGS

The above and other objects, features and advantages of the invention will become apparent from a consideration of the subsequent detailed description presented in connection with accompanying drawings, in which.

DRAWINGS LIST OF REFERENCE NUMERALS

The following is a list of reference labels used in the drawings to label components of different embodiments of the invention, and the names of the indicated components.

| | |
|---|---|
| 2000 | emergency egress assembly |
| 2001 | release mechanism |
| 2008 | handle fastener |
| 2010 | plug |
| 2010a | window frame |
| 2010b | window |
| 2010c | plug body |
| 2010d | stepped periphery of plug |
| 2010da | stepped periphery of plug inner lip section |
| 2010db | stepped periphery of plug outer lip section |
| 2010e | gasket |
| 2010f | frame fastener |
| 2018 | latch |
| 2018a | latch receiver |
| 2020 | lock pin |
| 2024 | vehicle door |
| 2024a | stepped periphery of egress portal |
| 2024aa | stepped periphery of egress portal inner lip section |
| 2024ab | stepped periphery of egress portal outer lip section |
| 2030 | pivot fastener |
| 2031 | cable |
| 2032 | handle |
| 2032a | lever bar |
| 2034 | latching and unlatching mechanism |

DETAILED DESCRIPTION

Referring now to FIGS. 1-5, a typical embodiment is shown there of a vehicle emergency egress assembly 2000 according to the invention. The embodiment includes: a vehicle door 2024 having a latching and unlatching mechanism 2034 for routine opening and closing of the door, and also having an egress portal or opening cut into the door or otherwise provided (by one or another method in the course of the door's original manufacture) in the portion of the door where a window would ordinarily be located and including an additional portion of the door, as needed, so that the opening is large enough for egress by a vehicle occupant; a plug 2010, having a plug body 2010c, for covering the egress portal until needed and including a window 2010b mounted in a window frame 2010a attached to the plug body; and a release mechanism 2001 for holding the plug in the egress portal until emergency egress is needed, and for then releasing the plug from the egress portal, as described below. The plug has a stepped periphery 2010d (FIG. 5) that mates with a corresponding stepped periphery 2024a (FIG. 4) of the door when the plug is in place, filling the opening.

The invention is intended to be used in case of an armored vehicle, having a so-called bulletproof window, i.e. transparent armor serving as a window. An advantage of the invention is that the plug 2010 in its entirety, or just the window portion thereof, can be provided with various levels of armor protection, or no armor at all, depending on the mission of the vehicle.

Figure 4:
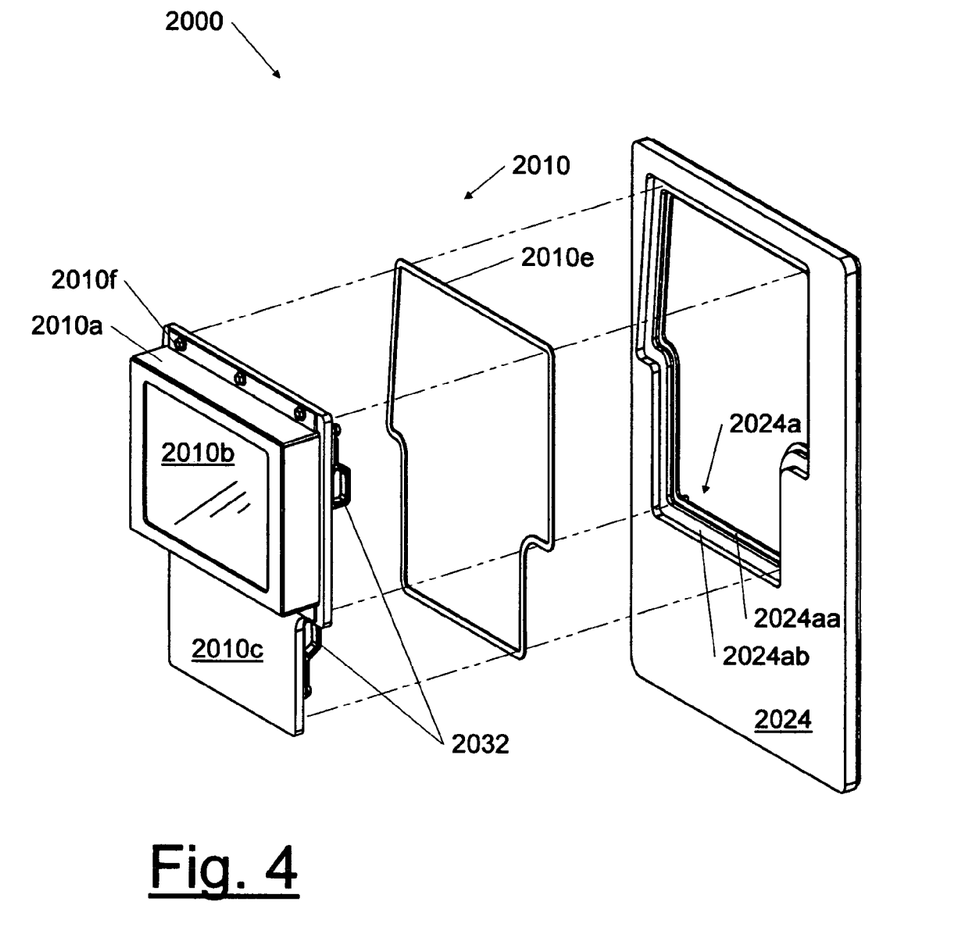
FIG. 4 is an exploded view of the emergency egress assembly of FIG. 1.
Figure 5:
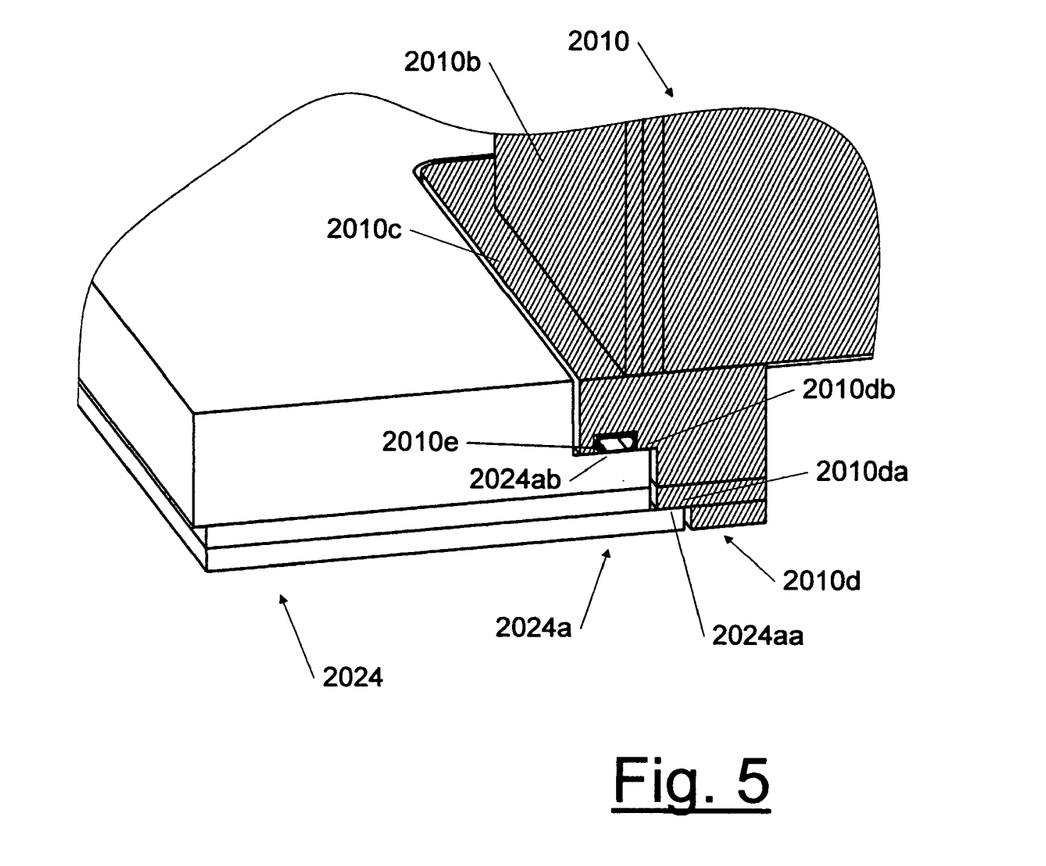
FIG. 5 is a partial perspective view of the emergency egress assembly of FIG. 1, showing a stepped periphery of the egress portal and a stepped periphery of the plug, the stepped periphery of the plug having two lip sections corresponding to two lip sections of the stepped periphery of the egress portal, and showing the two lip sections in abutting relation in the locked or engaged position.

In cutting or otherwise providing the egress portal, and as shown especially in FIGS. 4 and 5, the stepped periphery 2024a of the egress portal is machined or otherwise provided so as to have an inner lip section 2024aa defining the outer limits of the egress portal, and a substantially concentric outer lip section 2024ab, farther from the center of the egress portal and recessed from the outer surface of the door.

Also as shown especially in FIGS. 4 and 5, the door plug 2010 is also provided so as to have a stepped periphery 2010d, corresponding to that of the egress portal, and so having lip sections 2010da and 2010db corresponding, respectively, to the lip sections 2024aa and 2024ab provided as the stepped periphery 2024a of the egress portal in the door 2024. When the plug is in place and so covers and fills the egress portal, the lip sections of the egress portal abut the corresponding lip sections of the plug.

As mentioned, the egress portal or opening is cut into the vehicle door or otherwise provided so as to encompass the region where the door's window is located, but it is important to understand that the egress portal is provided so as to leave intact, if possible, the door's ordinary (non-emergency egress) latching and unlatching mechanism 2034 (FIG. 1) for routine entrance and exit of the vehicle. If the invention is to be used in a case where it is not feasible to leave the ordinary latching and unlatching mechanism intact (because of the requirement for providing a large enough emergency egress), a modified latching and unlatching mechanism must be provided, one that does not obstruct the opening used for emergency egress.

As indicated above, the plug 2010 is provided so as to insert into the egress portal/cut-out portion of the door 2024, with the lip sections of the stepped periphery 2010d of the plug 2010 abutting corresponding lip sections of the stepped periphery 2024a of the door 2024, so that the plug covers the egress portal. The plug is then secured to the door by latches 2018 included as part of a release mechanism 2001 described below, which latches are then disengaged by the release mechanism for emergency egress, as also described below.

In the embodiment shown in FIGS. 1-5, the release mechanism 2001 includes, for each latch 2018, a handle 2032 rigidly attached to the latch. The latches 2018 are disposed about the periphery of the plug 2010 in spaced apart relation. Corresponding latch receivers 2018a (FIGS. 2 and 3), also called strikefaces, are provided on the inside surface of the vehicle door 2024, each disposed so as to receive a respective latch when the handles are turned to secure the plug 2010 in the vehicle door.

As shown more specifically in FIG. 4, the plug 2010 is comprised of a window frame 2010a holding a window pane 2010b, and attached to the plug body 2010c by one or another fastening device (shown as bolts 2010f as shown in FIG. 4). The window pane 2010b is typically a laminate of materials serving as a so-called transparent armor system. As mentioned, advantageously, the plug 2010 in its entirety or just the window pane 2010b and window frame 2010a, may be swapped with another plug or window frame and window pane providing a different level of ballistic and blast protection or none at all (depending on the mission) in order to save weight.

Thus, the plug body 2010c typically is comprised of at least one layer of material consistent with the ballistic makeup of the vehicle door 2024. However, in some embodiments, the plug body 2010c is comprised of lightweight material of a different ballistic makeup than the door, for use with vehicles where armoring is not necessary, to decrease overall vehicle weight.

Advantageously, as shown especially in FIGS. 4 and 5, a resiliently pliable gasket 2010e is inserted into a groove inside the outer lip section 2010db of the stepped periphery 2010d of the plug 2010. The plug is inserted into the egress portal of the vehicle door 2024 from the exterior side of the vehicle door. The stepped periphery 2010d of the plug and the stepped periphery 2024a of the egress portal in combination serve to both help secure the plug 2010 in the egress portal, and ensure that when the plug 2010 is disengaged from the vehicle door 2024, the plug 2010 falls away or can be pushed away, outward from the vehicle, and cannot fall into the vehicle and block egress.

A vehicle door according to the invention can be manufactured with the egress portal already included, or instead made from a vehicle door originally provided without an egress portal. In the latter case, where an egress portal is provided post original manufacture, the window and its frame are typically first removed and saved for later as part of the plug, and an opening is then machined into the door encompassing the area where the window was located and also typically more area, in order to provide an opening or portal sufficient for enabling egress but not interfering with the door's ordinary latching and unlatching mechanism used to open and close the vehicle door for routine entry and exit from the vehicle. Machining an opening into the vehicle door may be said to create a uniframe for the plug that is to be provided, which is (structurally) stronger than a frame comprised of more than one piece in a plane of the frame.

Figure 1:
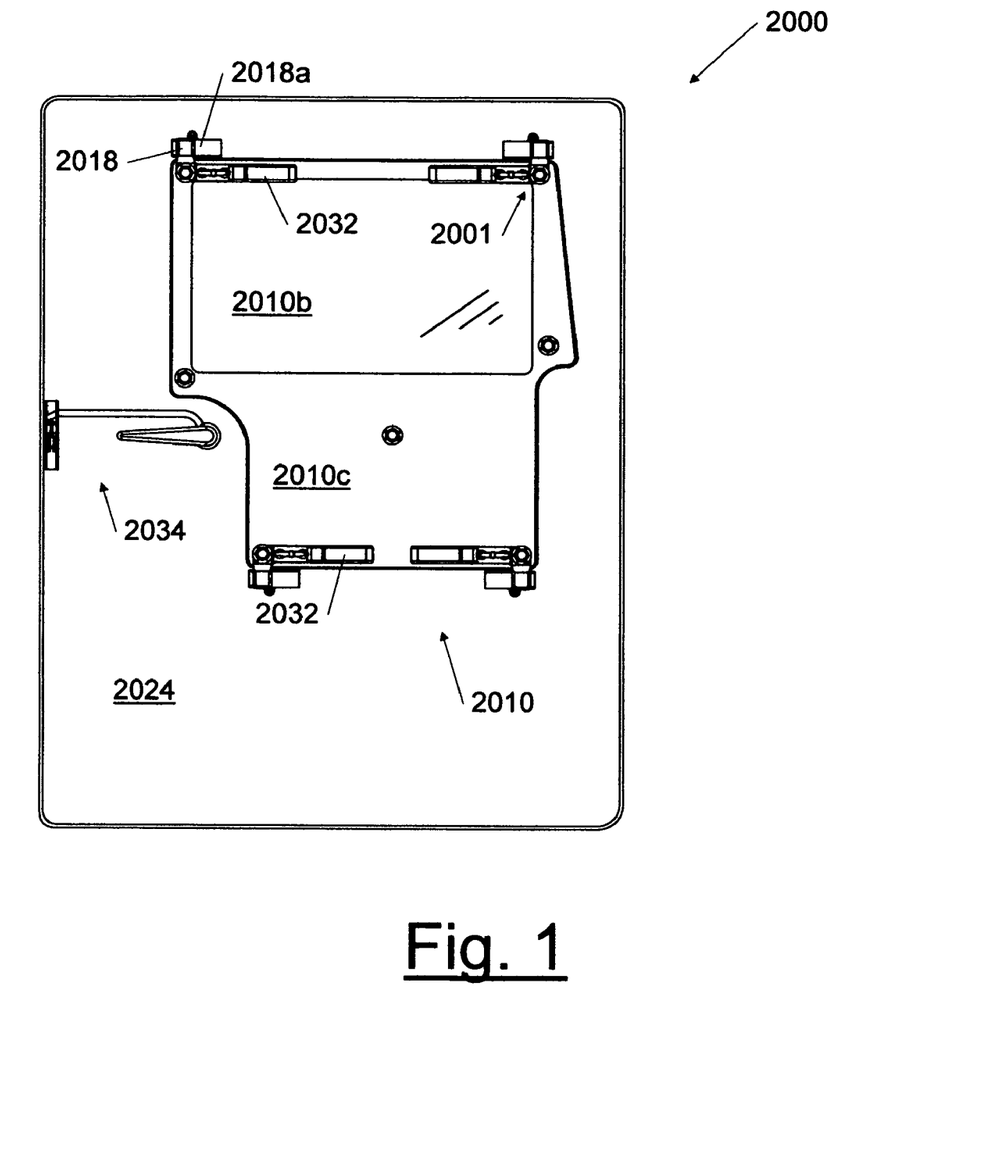
FIG. 1 is an elevation view of a vehicle emergency egress assembly according to the invention, including a plug encompassing a window and releasably secured in an egress portal of a door of the vehicle by a release mechanism, as viewed from the inside of the vehicle.
Figure 2:
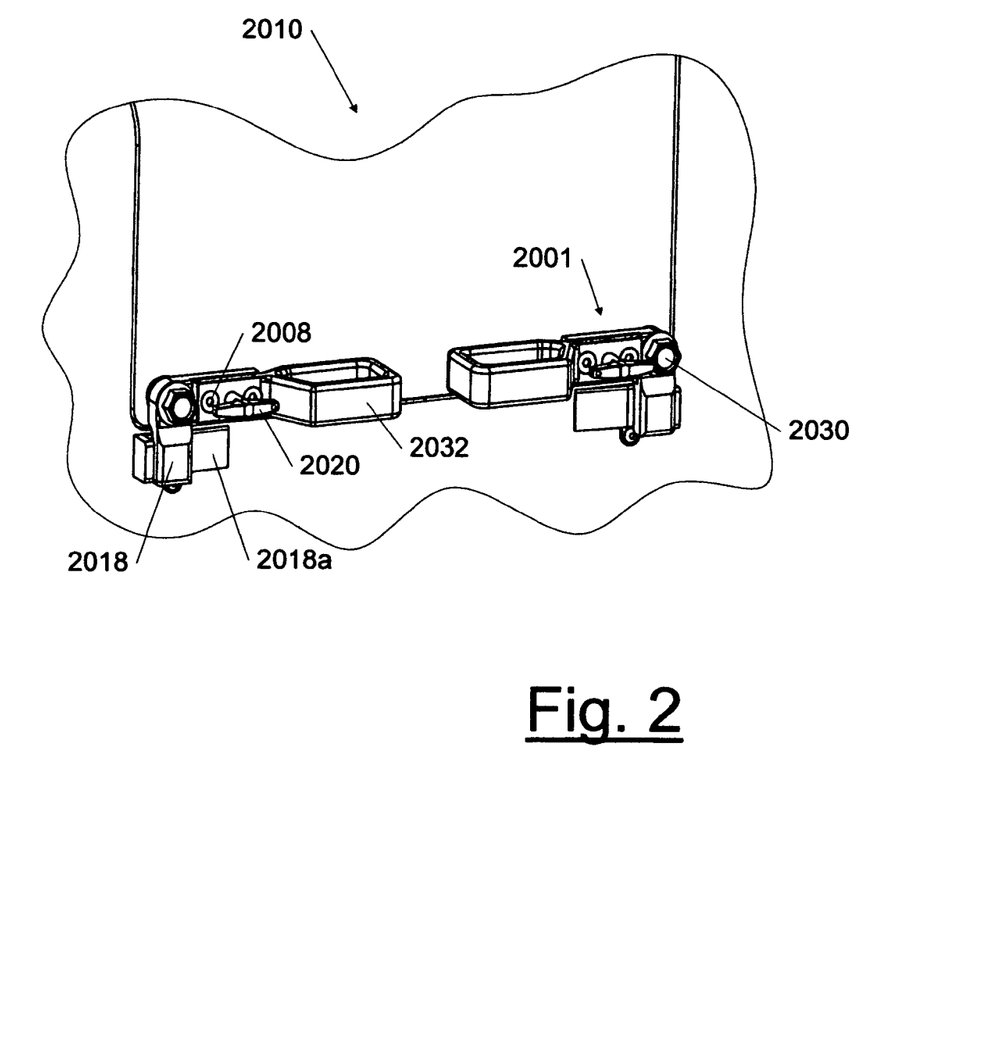
FIG. 2 is a partial perspective view of the emergency egress assembly of FIG. 1 showing components of the release mechanism in a locked or engaged position.
Figure 3:
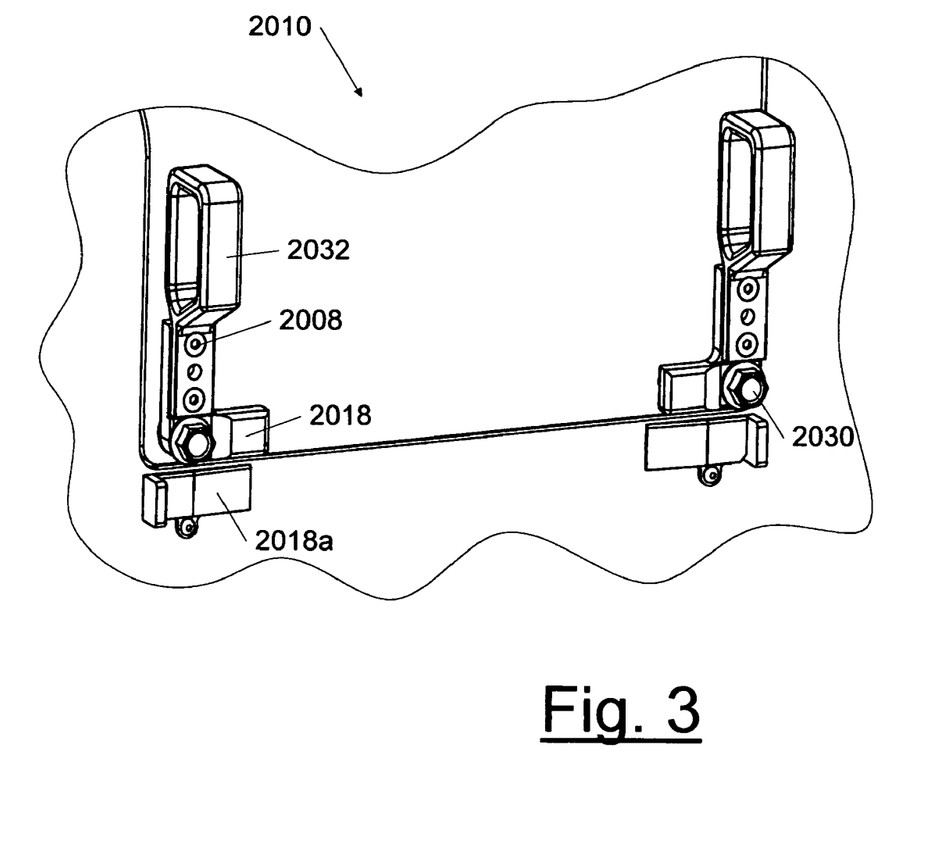
FIG. 3 is a partial perspective view of the emergency egress assembly of FIG. 1 showing components of the release mechanism in an open or disengaged position.

As shown more particularly in FIGS. 1-3, the plug 2010 is held secure in the egress portal of the vehicle door 2024 by the release mechanism 2001, comprising a plurality of latches 2018 arranged about the periphery of the plug body 2010*c*, a respective plurality of latch receivers 2018*a* disposed around the egress portal on the inside surface of the vehicle door 2024, and a respective plurality of handles 2032, each handle rigidly attached to a respective one of the latches 2018 by fasteners 2008. For each handle 2032, a pivot fastener 2030 extends through the latch 2018 and secures the handle to the plug body 2010*c*. A lock pin 2020 pierces the handle 2032, preventing the handle from being operated (pivoted) and so maintaining the latch in a locked or engaged position (FIGS. 1 and 2). The plug 2010 is secured into the vehicle door by each latch 2018 engaging its respective latch receiver 2018*a*. In an emergency situation, a vehicle occupant removes the lock pins 2020 from the respective handles 2032 and then pivots the handles about the respective pivot fasteners 2030, thus causing the latches 2018 to pivot away from the respective latch receivers (FIG. 3), allowing the plug 2010 to be pushed or kicked outside the vehicle, away from the vehicle's interior cabin area.

Figure 6:
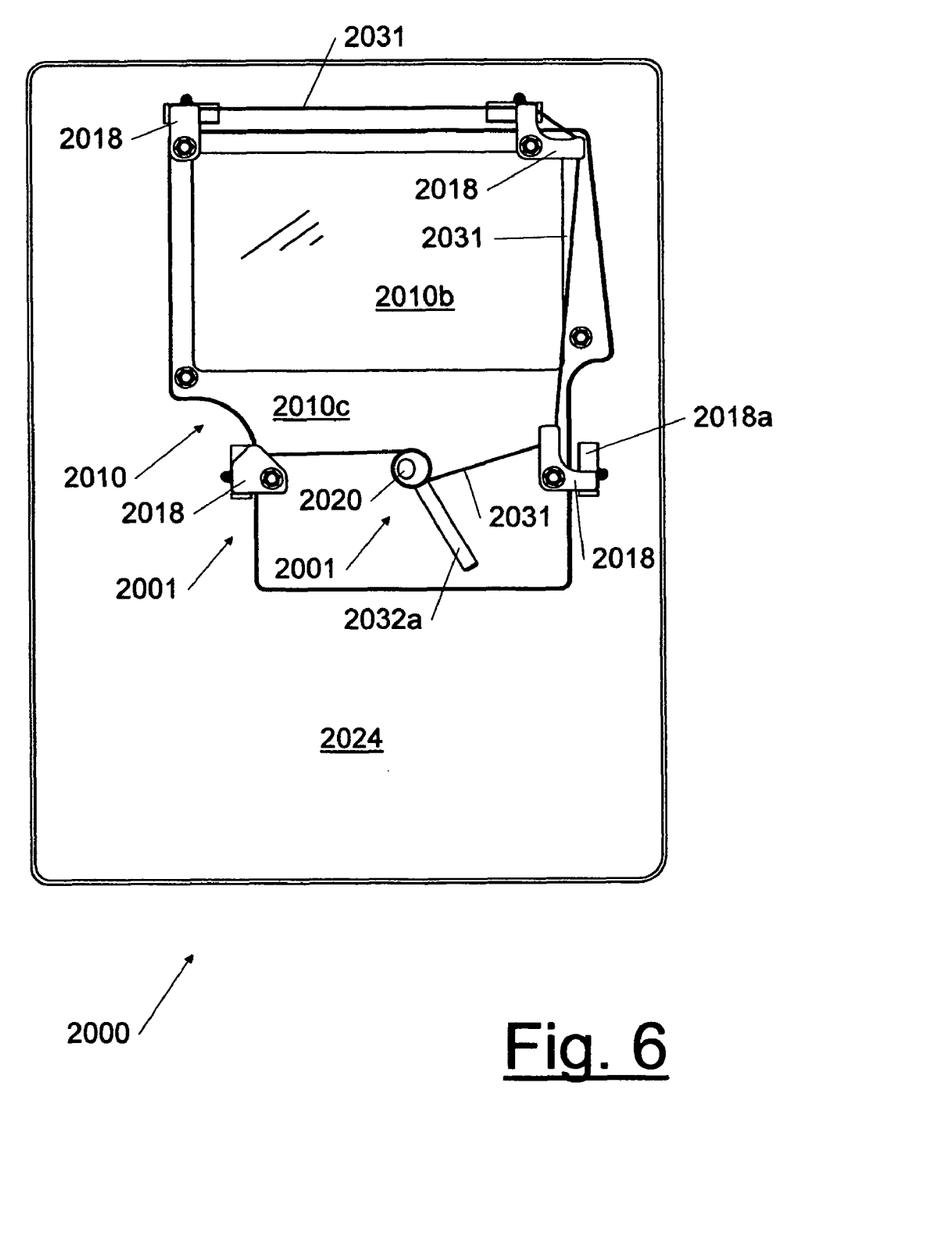
FIG. 6 is a perspective view of another embodiment of an emergency egress assembly according to the invention, seen from the inside of the vehicle, having a release mechanism including a plurality of latches attached in series by a cable controlled by a release handle.
Figure 7:
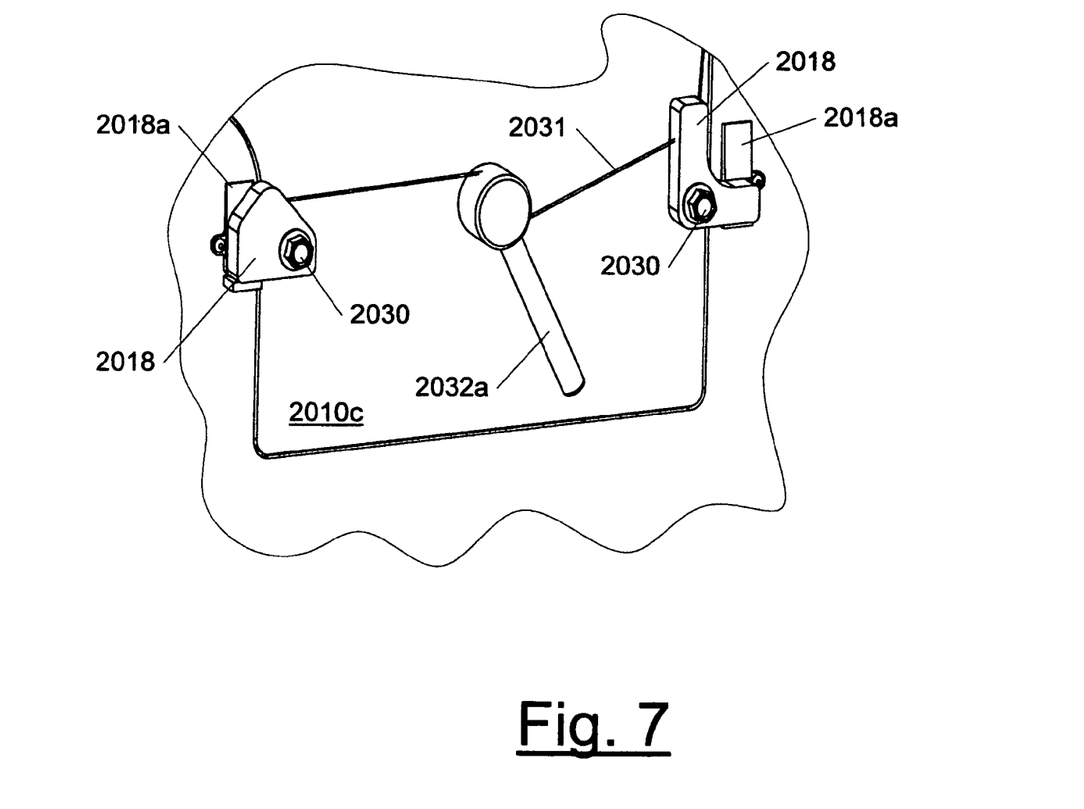
FIG. 7 is a partial perspective view of the embodiment shown in FIG. 6, showing two of the latches of the release mechanism in a locked or engaged position.
Figure 8:
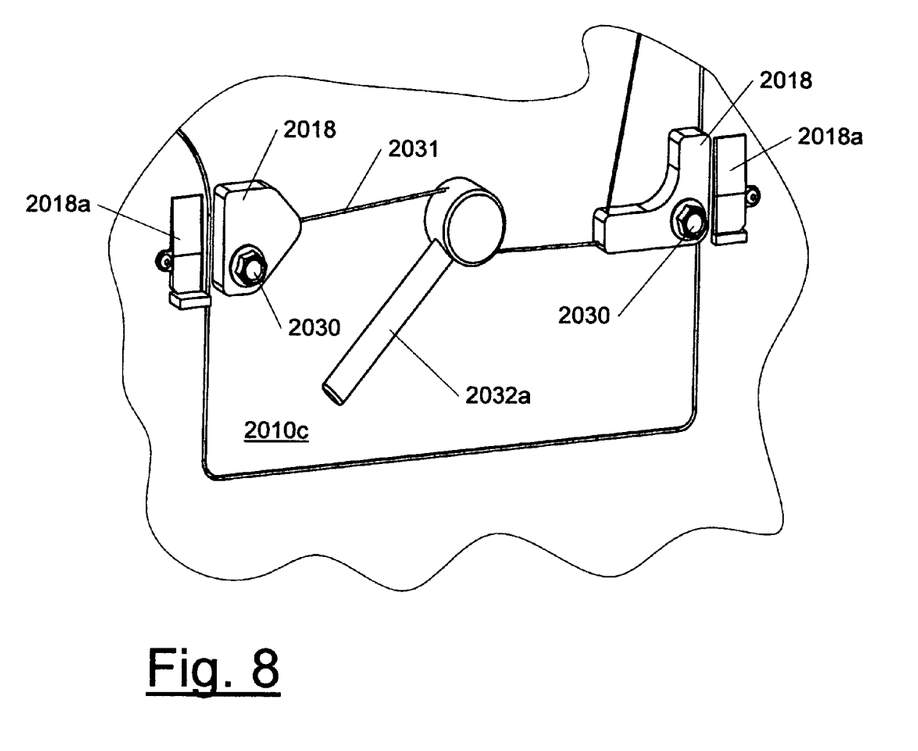
FIG. 8 is a partial perspective view of the embodiment shown in FIG. 6, showing two of the latches of the release mechanism in an open or disengaged position.

In FIGS. 6-8, another embodiment of an emergency egress assembly according to the invention is shown, differing only in that instead of a handle 2032 for each latch 2018, the release mechanism 2001 in this other embodiment comprises a single rotatable lever handle/bar 2032*a* operably connected to all the plurality of latches 2018 by cabling 2031. A lock pin 2020 secures and locks the release mechanism 2001, preventing the accidental release of the plug 2010. Rotating/pivoting the lever bar 2032*a* pulls the cabling 2031 and in consequence pivots the latches 2018 away from their respective latch receivers 2018*a*, allowing the plug 2010 to fall away from or be pushed away from the vehicle door 2024. The cabling 2031 is typically comprised of metallic wire or metallic band, but in some embodiments it may be comprised of fabric cord or fabric band or any other suitable material.

The original door, due to armoring, can weigh hundreds of pounds, and perhaps as much as a thousand pounds, and so even if the door is not jammed as a result of an incident, the door can be quite hard to open depending on the orientation of the vehicle. The plug, though, can weigh as little as half the weight of the entire door, and so is easier to remove to allow egress from the vehicle.

It is to be understood that the arrangements shown and described above and in the attachments are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A vehicle emergency egress assembly suitable for a vehicle, the vehicle emergency egress assembly comprising:
    a vehicle door comprising one or more layers of opaque armor, the vehicle door having an inside surface facing an occupant compartment of the vehicle and an outside surface facing away from the occupant compartment of the vehicle, and an interior portion of the vehicle door defined by a perimeter portion of the vehicle door;
    an egress portal formed in the interior portion;
    a stepped periphery defining an outer perimeter of the egress portal;
    a latching and unlatching mechanism affixed to the vehicle door;
    a plug having a plug body, the plug body having a stepped periphery defining an outer perimeter of the plug body and shaped to mate with the stepped periphery of the egress portal,
    wherein the plug is releasably disposable in the egress portal via a mating of the stepped periphery of the egress portal and the stepped periphery of the plug body, and
    wherein the plug fills the egress portal when the plug is disposed therein;
    an opening formed in the plug body;
    a window affixed to the plug body and covering the opening,
    wherein the window further comprises a window pane of one or more layers of transparent material and a frame holding the window pane, and
    wherein the plug body further comprises one or more layers of opaque material, and
    interiorly accessible release means selectively operable by a vehicle occupant,
    wherein operating the interiorly accessible release means shifts the plug from the vehicle door to allow emergency egress by the vehicle occupant through the egress portal, and
    wherein engaging the latching and unlatching mechanism allows for routine opening and closing of the vehicle door when the vehicle door is mounted on the vehicle.

2. A vehicle emergency egress assembly as in claim 1, wherein the interiorly accessible release means further comprises:
    a plurality of latch receivers provided as tapered blocks and disposed on the inside surface of the vehicle door in spaced apart relation around the egress portal; and
    plurality of latches corresponding to the plurality of latch receivers pivotably attached to the plug,
    wherein the plurality of latches are disposed so that in pivoting to a closed position to secure the plug in the egress portal each latch moves from a first section of the corresponding latch receiver to a thicker second section, thereby drawing the plug into the egress portal with the stepped periphery of the plug mated with the stepped periphery of the egress portal.

3. A vehicle emergency egress assembly as in claim 2, the interiorly accessible release means further comprising:
    a plurality of pivotable handles corresponding to the plurality of latches, each pivotable handle rigidly attached to each latch, the plurality of pivotable handles selectively operable by the vehicle occupant; and
    the stepped periphery of the egress portal further comprising a lip section; and
    the stepped periphery of the plug further comprising a lip section;
    wherein to secure the plug in the egress portal, the plurality of latches are placed in firm mechanical contact with the plurality of latch receivers by pivoting the plurality of pivotable handles, whereby the plug is pulled onto the egress portal so that the lip section of the stepped periphery of the plug abuts the lip section of the stepped periphery of the egress portal, and wherein to free the plug from the door, the plurality of latches are pivoted away from the plurality of latch receivers by pivoting the plurality of pivotable handles.

4. A vehicle emergency egress assembly as in claim 2, further comprising:

a lever handle with an enlarged base portion, the lever handle pivotably attached to the plug body; and at least one cable operably connected to the plurality of latches and to the enlarged base portion of the lever handle, wherein operating the lever handle pulls the at least one cable and thereby pivots the latches away from the latch receivers, thereby allowing the plug to be pushed outward and away from the vehicle door.

5. A vehicle emergency egress assembly as in claim 4, wherein the at least one cable is a metallic wire.

6. A vehicle emergency egress assembly as in claim 4, wherein the at least one cable is a metallic band.

7. A vehicle emergency egress as in claim 4, wherein the at least one cable is a metallic cord.

8. A vehicle emergency egress as in claim 4, wherein the at least one cable is a fabric cord.

9. A vehicle emergency egress assembly as in claim 4, wherein the at least one cable is a fabric band.

10. A vehicle emergency egress assembly as in claim 2, wherein the stepped periphery of the egress portal has a plurality of concentric lip sections including at least an innermost lip section and an outermost lip section, and the stepped periphery of the plug has a corresponding plurality of concentric lip sections including at least an innermost lip section and an outermost lip section, for mating with the innermost lip section and the outermost lip section of the stepped periphery of the egress portal.

11. A vehicle emergency egress assembly as in claim 10, wherein a resilient gasket is provided in combination with at least the outermost lip section of the stepped periphery of the plug.

12. A vehicle emergency egress assembly as in claim 11, wherein the resilient gasket is partially recessed in the innermost lip section of the stepped periphery of the plug.

13. A vehicle emergency egress assembly as in claim 1, wherein the plug body is comprised of a same one or more layers of opaque armor as the vehicle door.

14. A vehicle emergency egress assembly as in claim 1, wherein the plug body comprises different opaque material than the vehicle door.

15. A vehicle emergency egress assembly as in claim 1, wherein the window pane comprises transparent armor materials providing substantially a same level of protection as the one or more layers of opaque armor of the vehicle door.

16. A vehicle emergency egress assembly as in claim 1, wherein the window pane comprises only a single layer of transparent material or transparent armor materials providing a substantially lesser level of protection as the one or more layers of opaque armor of the vehicle door.

* * * * *